(12) United States Patent
Kim et al.

(10) Patent No.: US 11,837,749 B2
(45) Date of Patent: *Dec. 5, 2023

(54) BATTERY SUB-PACKING UNIT AND BATTERY MODULE INCLUDING THE SAME

(71) Applicant: SK On Co., Ltd., Seoul (KR)

(72) Inventors: Suk Chul Kim, Daejeon (KR); Dae Won Kwon, Daejeon (KR); Yong Uk Kim, Daejeon (KR); Jong Ho Seok, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,515

(22) Filed: Feb. 9, 2023

(65) Prior Publication Data

US 2023/0187776 A1 Jun. 15, 2023

Related U.S. Application Data

(63) Continuation of application No. 17/167,248, filed on Feb. 4, 2021, now Pat. No. 11,611,129.

(30) Foreign Application Priority Data

Feb. 7, 2020 (KR) .................. 10-2020-0015130
Jan. 27, 2021 (KR) .................. 10-2021-0011273

(51) Int. Cl.
*H01M 50/383* (2021.01)
*H01M 50/186* (2021.01)
(Continued)

(52) U.S. Cl.
CPC ..... *H01M 50/383* (2021.01); *H01M 10/0525* (2013.01); *H01M 50/186* (2021.01); *H01M 50/211* (2021.01)

(58) Field of Classification Search
CPC .. H01M 50/211; H01M 50/30; H01M 50/383; H01M 50/186
See application file for complete search history.

(56) References Cited

U.S. PATENT DOCUMENTS

| 2006/0232135 A1 | 10/2006 | Kim et al. |
| 2008/0171259 A1 | 7/2008 | Kanai et al. |

(Continued)

FOREIGN PATENT DOCUMENTS

| CN | 1855598 A | 11/2006 |
| CN | 1961438 A | 5/2007 |

(Continued)

OTHER PUBLICATIONS

Office Action for the U.S. Appl. No. 17/167,248 issued by the USPTO dated Aug. 30, 2022.

(Continued)

*Primary Examiner* — Imran Akram
(74) *Attorney, Agent, or Firm* — IP & T GROUP LLP

(57) ABSTRACT

A battery sub-packing unit includes a plurality of secondary battery cells, a cell support member including a seating portion for accommodating the plurality of secondary battery cells, and a venting inducing portion connecting the seating portion to an external area, and a case member provided to surround the secondary battery cell accommodated in the seating portion and to seal around the secondary battery cell.

7 Claims, 13 Drawing Sheets

(51) Int. Cl.
*H01M 50/211* (2021.01)
*H01M 50/291* (2021.01)
*H01M 10/0525* (2010.01)

(56) References Cited

U.S. PATENT DOCUMENTS

| | | |
|---|---|---|
| 2008/0220321 A1 | 9/2008 | Yonemochi et al. |
| 2011/0183176 A1 | 7/2011 | Schwab et al. |
| 2012/0189906 A1 | 7/2012 | Nakajima et al. |
| 2012/0214033 A1 | 8/2012 | Damon et al. |
| 2013/0122335 A1 | 5/2013 | Park et al. |
| 2013/0216866 A1* | 8/2013 | Kim .................. H01M 10/0436 429/7 |
| 2013/0288099 A1 | 10/2013 | Kim |
| 2015/0093608 A1 | 4/2015 | Seong et al. |
| 2015/0147605 A1 | 5/2015 | Kim et al. |
| 2016/0141587 A1* | 5/2016 | Suh ..................... H01M 50/126 429/186 |
| 2016/0197316 A1* | 7/2016 | Park .................. H01M 10/0436 29/623.2 |
| 2017/0033419 A1 | 2/2017 | Eom et al. |
| 2017/0187080 A1 | 6/2017 | Choi et al. |
| 2018/0062148 A1 | 3/2018 | Cho et al. |
| 2018/0241023 A1* | 8/2018 | Lim ..................... H01M 50/178 |
| 2018/0375078 A1* | 12/2018 | Lee ......................... B60L 50/66 |
| 2019/0221819 A1* | 7/2019 | Xing ................. H01M 10/0587 |
| 2020/0020903 A1* | 1/2020 | Yun ..................... H01M 50/271 |
| 2020/0176745 A1 | 6/2020 | Lee |
| 2020/0350530 A1 | 11/2020 | Kim et al. |

FOREIGN PATENT DOCUMENTS

| | | |
|---|---|---|
| CN | 101262049 A | 9/2008 |
| CN | 201706010 U | 1/2011 |
| CN | 102142575 A | 8/2011 |
| CN | 102610769 A | 7/2012 |
| CN | 103378319 A | 10/2013 |
| CN | 203415658 U | 1/2014 |
| CN | 106953135 A | 7/2017 |
| CN | 107534098 A | 1/2018 |
| CN | 206976528 U | 2/2018 |
| CN | 109920944 A | 6/2019 |
| JP | 2008-140629 A | 6/2008 |
| JP | 2016-110881 A | 6/2016 |
| KR | 10-2015-0061200 A | 6/2015 |
| KR | 10-2017-0014309 A | 2/2017 |

OTHER PUBLICATIONS

Notice of Allowance for the U.S. Appl. No. 17/167,248 issued by the USPTO dated Dec. 21, 2022.

Office Action for the Chinese Patent Application No. 202110166235.8 issued by the Chinese Patent Office dated Jun. 28, 2023.

\* cited by examiner

BATTERY SUB-PACKING UNIT AND BATTERY MODULE INCLUDING THE SAME

CROSS-REFERENCE TO RELATED APPLICATION(S)

This application is a continuation of U.S. patent application Ser. No. 17/167,248 filed on Feb. 4, 2021, which claims benefit of priority to Korean Patent Application No. 10-2020-0015130 filed on Feb. 7, 2020 and Korean Patent Application No. 10-2021-0011273 filed on Jan. 27, 2021 in the Korean Intellectual Property Office, the disclosure of which are incorporated herein by reference in their entirety.

BACKGROUND

1. Field

Example embodiments of the present disclosure relate to a battery sub-packing unit and a battery module including the same.

2. Description of Related Art

As technological development and demand for mobile devices, electric vehicles, energy storage systems (ESS), and the like, have increased, the demand for a secondary battery cell as an energy source has rapidly increased. A secondary battery cell may be charged and discharged repeatedly in that mutual conversion between chemical energy and electrical energy is reversible.

Such a secondary battery cell may include an electrode assembly including a positive electrode, a negative electrode, a separator, and an electrolyte, major components of a secondary battery, and a cell body member of a laminated film case protecting the electrode assembly.

Such an electrode assembly may generate heat while going through charging and discharging, and a temperature increase caused by the heat generation may degrade performance of the secondary battery cell.

Also, when the heat generation becomes severe, internal pressure of the secondary battery cell may increase such that the secondary battery cell may be ignited.

Further, when a plurality of secondary battery cells are mounted as in an energy storage system (ESS), a secondary battery cell may explode along with the above-described ignition, and the flame may spread to the neighboring secondary battery cells.

To address the above-described issues, a research on a battery sub-packing unit and a battery module including the same has been necessary.

SUMMARY

An example embodiment of the present disclosure is to provide a battery sub-packing unit and a battery module including the same, which may prevent propagation of ignition of a secondary battery cell, or may shield secondary battery cells to prevent heat generated by one of the secondary battery cell from spreading to a neighboring secondary battery cell.

Another example embodiment of the present disclosure is to provide a battery sub-packing unit and a battery module including the same, which may induce a flame to one side or may smother and extinguish the flame when the secondary battery cell is ignited.

According to an example embodiment of the present disclosure, a battery sub-packing unit includes a plurality of secondary battery cells, a cell support member including a seating portion for accommodating the plurality of secondary battery cells, and a venting inducing portion connecting the seating portion to an external area, and a case member provided to surround the secondary battery cell accommodated in the seating portion and to seal around the secondary battery cell.

The venting inducing portion may be formed at one end of the cell support member, and forms a cross-sectional area greater than 0.1% of an area of the one end and smaller than 10% of the area of the one end.

The venting inducing portion may be formed at one end of the cell support member, and forms a cross-sectional area of 5 to 99 mm$^2$.

The venting inducing portion may be formed at one end of the cell support member, and forms a cross-sectional area of 25 to 75 mm$^2$.

The cell support member may include a blocking member attached to an external side of one end of the cell support member on which the venting inducing portion is formed, shielding the venting inducing portion, and opening the venting inducing portion by being detached when pressure in the seating portion increases by explosion of the secondary battery cell.

The cell support member may include a liquid guide tab provided on an external side of one end of the cell support member on which the venting inducing portion is formed, disposed on a lower side of the venting inducing portion, and including a rail groove for guiding leakage of electrolyte caused by explosion of the secondary battery cell.

The case member is formed of a single metal material or an alloy material maintaining a shape thereof up to at least 800° C.

The case member is formed of iron (Fe) in a thickness of 0.45 to 2 mm, or is formed of aluminum (Al) in a thickness of 0.8 to 3 mm.

The case member may have one end configured to be closed and the other end configured to be open, such that the one end and the other end may be inserted into and coupled to an upper portion and a lower portion of the cell support member in which the secondary battery cell is accommodated, respectively.

A coupling end, the other end, of the case member may be bent to be inserted into a coupling groove formed in the cell support member and may be bent multiple times to include a notch shape, such that the case member may be in close contact with the cell support member.

According to another example embodiment of the present disclosure, a battery module includes a plurality of secondary battery cells, a battery sub-packing unit including a cell support member accommodating the plurality of secondary battery cells and a case member configured to surround the secondary battery cells, and a body frame member in which a plurality of the battery sub-packing units are installed.

In the battery sub-packing unit, the accommodated secondary battery cell may be a pouch-type secondary battery cell or a lithium ion secondary battery cell.

The battery module may further include a barrier member disposed between the plurality of battery sub-packing units adjacent to each other and preventing flame or heat from spreading.

The barrier member may be disposed between the plurality of case members, adjacent to each other and disposed with a gap of at least 7 mm therebetween.

The barrier member may include a shielding surface disposed between the case members adjacent to each other and having external surfaces opposing each other, and a support protrusion provided on the shielding surface and protruding in a direction of an external surface of the case member.

The support protrusion may be configured to protrude to the shielding surface in a hemispherical shape or a pyramidal shape in point-contact with the external surface of the case member.

The support protrusion may be configured to protrude to the shielding surface in a semicircular columnar shape or an angular columnar shape in line-contact with the external surface of the case member.

At least a portion of the shielding surface may have a bellows shape.

The barrier member may be formed of a thermosetting polymer material, a polyphenylene sulfide material, or a material including gypsum, maintaining a shape thereof up to at least 800° C.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
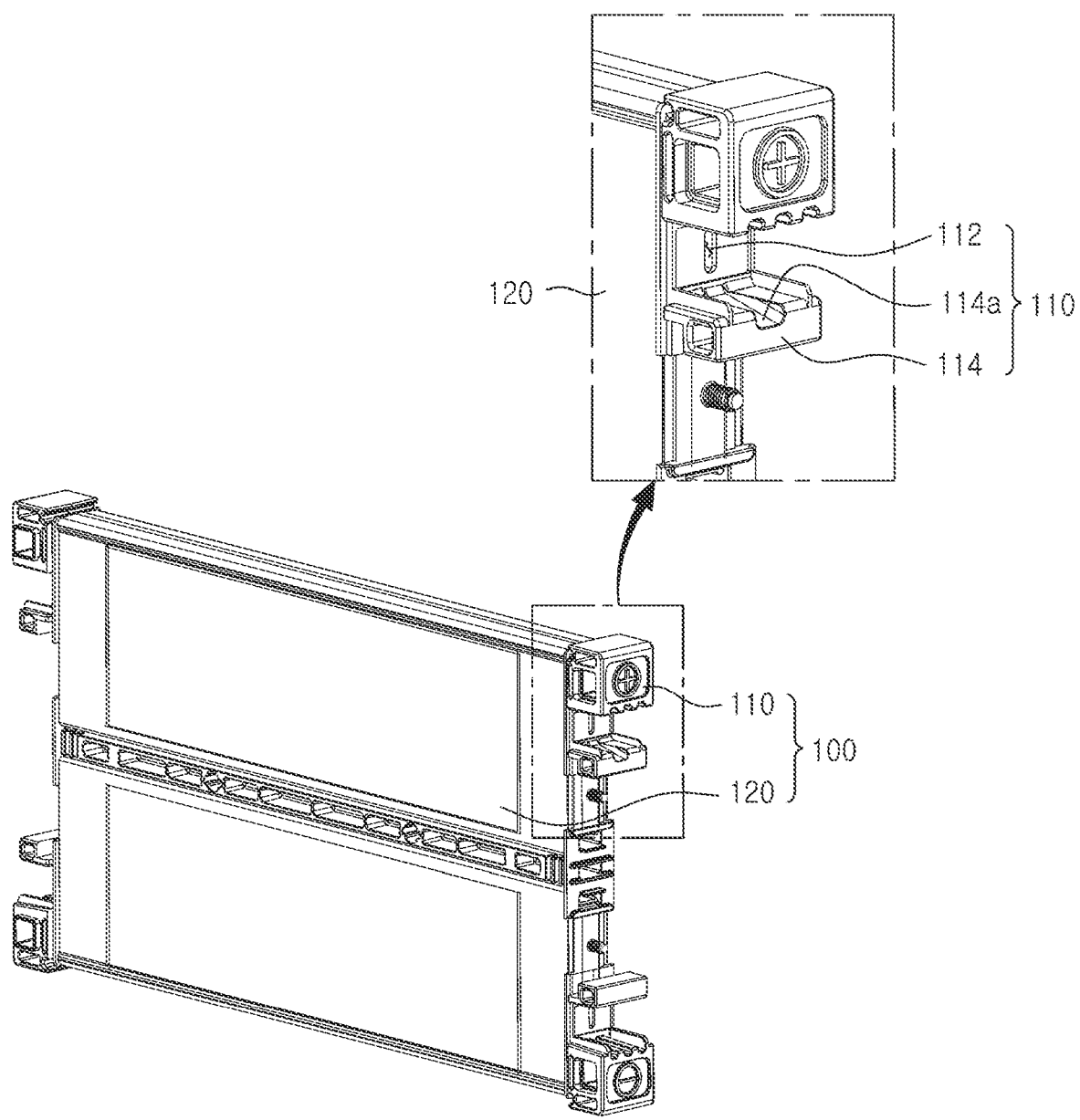
FIG. 1 is a perspective diagram illustrating a battery sub-packing unit according to an example embodiment of the present disclosure.

Hereinafter, embodiments of the present disclosure will be described as follows with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are same elements in the drawings.

The terms used in the following description are provided to explain a specific example embodiment and are not intended to be limiting. A singular term includes a plural form unless otherwise indicated. The terms, "include," "comprise," "is configured to," etc. of the description are used to indicate the presence of features, numbers, steps, operations, elements, parts or combination thereof, and may not exclude the possibilities of combination or addition of one or more features, numbers, steps, operations, elements, parts or combination thereof.

An example embodiment relates to a battery sub-packing unit 100 and a battery module including the same, which may prevent propagation of ignition of the secondary battery cell C or may shield the secondary battery cells C to prevent heat generated by one secondary battery cell C from spreading to a neighboring secondary battery cell C.

In another aspect, a battery sub-packing unit 100 and a battery module including the same may induce a flame to one side or may smother and extinguish the flame when the secondary battery cell is ignited.

The battery module in the example embodiment may, when a plurality of secondary battery cells C are mounted as in an energy storage system (ESS), address the issue in which one of the one secondary battery cell C explodes or generated heat spreads to the other secondary battery cell C, and the secondary battery cells C explode consecutively.

Figure 2:
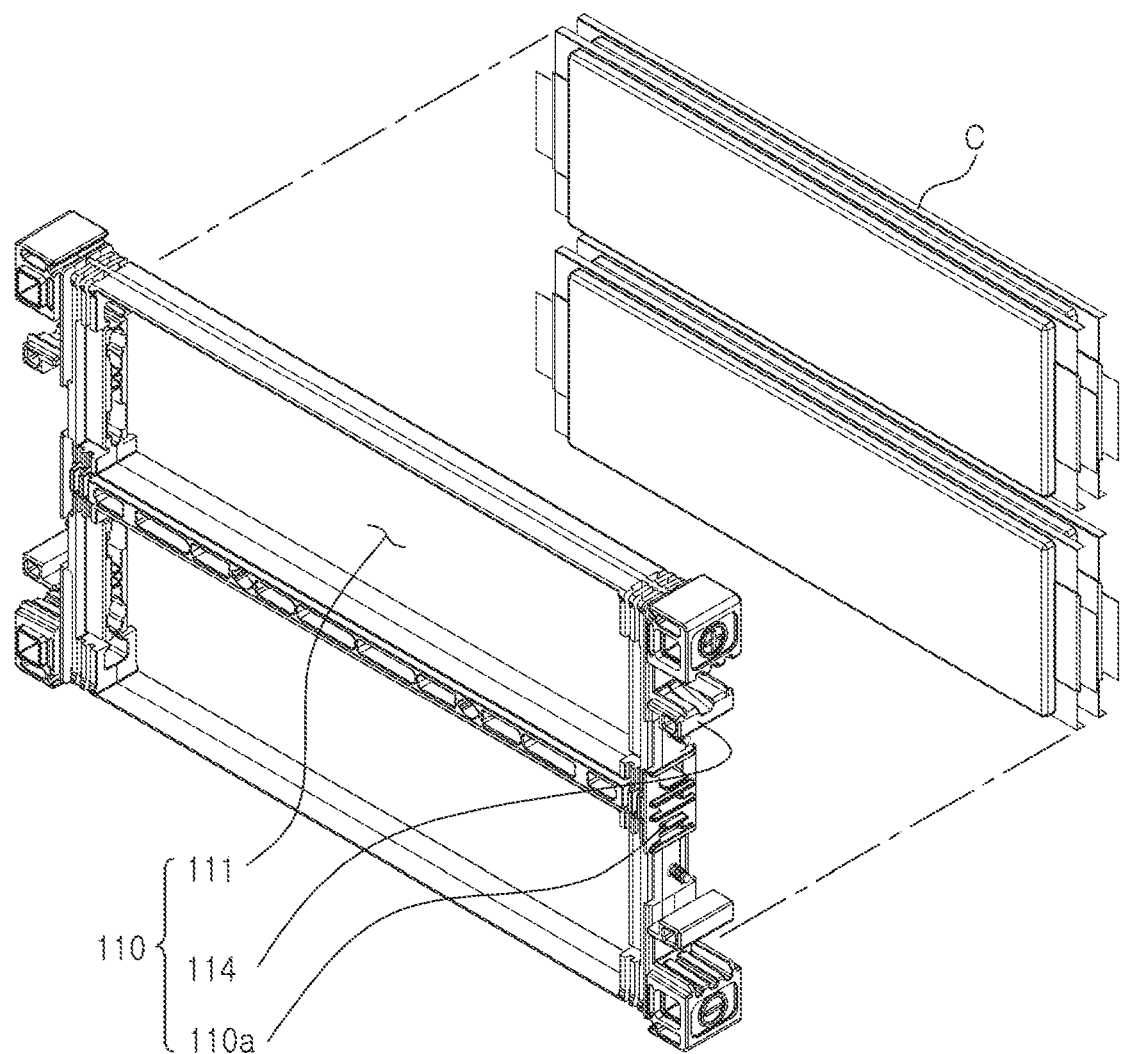
FIG. 2 is a perspective diagram illustrating a cell support member of a battery sub-packing unit according to an example embodiment of the present disclosure.

FIG. 1 is a perspective diagram illustrating a battery sub-packing unit 100 according to an example embodiment. FIG. 2 is a perspective diagram illustrating a cell support member 110 of a battery sub-packing unit 100 according to an example embodiment. Referring to FIGS. 1 and 2, the battery sub-packing unit 100 in an example embodiment may include a plurality of secondary battery cells C, a cell support member 110 including a seating portion 111 for accommodating the plurality of secondary battery cells C, and a venting inducing portion 112 connecting the seating portion 111 to an external area, and a case member 120 provided to surround the secondary battery cell C accommodated in the seating portion 111 and to seal around the secondary battery cell C.

The battery sub-packing unit 100 in the example embodiment may induce a flame or a gas to the venting inducing portion 112 when the secondary battery cell C explodes and a flame or a gas is generated. In other words, since the case member 120 is configured to surround the seating portion 111 in which the secondary battery cell C is disposed, and the venting inducing portion 112 is formed in the cell support member 110, the flame or the gas caused by the explosion of the secondary battery cell C may be induced to the venting inducing portion 112 connected to an external area in which a pressure is lower than that of an internal area of the seating portion 111.

Thus, since the cell support member 110 includes the seating portion 111 on which the secondary battery cell C is seated, and includes the venting inducing portion 112, when the pressure in the seating portion 111 is higher than that of the external area, the frame generated while high-pressure gas is ejected to the venting inducing portion 112 may also be induced to the venting inducing portion 112.

The seating portion 111 may be configured such that a single secondary battery cell C is seated or a plurality of secondary battery cells C are seated.

As an example, as illustrated in FIG. 2, the seating portion 111 may be formed above and below the cell support member 110, and a pair of secondary battery cells C may be provided to be in contact with each of the seating portions 111. The seating portion 111 may be configured to have a hole shape, and the secondary battery cells C are in close contact with each other when the plurality of secondary battery cells C are seated, such that an accommodation space of the secondary battery cell C may be reduced.

The venting inducing portion 112 may have a hole shape. However, an example embodiment thereof is not limited thereto, and the venting inducing portion 112 may be implemented by any element able to induce the flame or the gas.

Also, by limiting the size of the venting inducing portion 112, the generated flame may be induced to an external area and may be smother and extinguished.

The venting inducing portion 112 of the battery sub-packing unit 100 in an example embodiment may be formed on one end 110a of the cell support member 110, and may be formed to have a cross-sectional area A2 smaller than at least 10% of an area A1 of the one end 110a. As an example, the venting inducing portion may form a cross-sectional area A2 larger than 0.1% of the area A1 of the one end 110a and smaller than 10% of the area A1.

The ratio of the size of the cross-sectional area A2 of the venting inducing portion 112 to the size of the area A1 of one end 110a of the cell support member 110 in which the venting inducing portion 112 is formed may be limited.

Also, the size of the cross-sectional area A2 of the venting inducing portion 112 may be limited to an absolute area value. That is, the venting inducing portion 112 of the battery sub-packing unit 100 in the example embodiment may be formed on the one end 110a of the cell support member 110, and may have the cross-sectional area A2 of 5 to 99 mm$^2$.

More preferably, the venting inducing portion 112 of the battery sub-packing unit 100 in the example embodiment may be formed on the one end portion 110a of the cell support member 110, and may have the cross-sectional area A2 of 25 to 75 mm$^2$.

By limiting the size of the cross-sectional area A2 of the venting inducing portion 112, a flame may be induced to the venting inducing portion 112, and inflow of air to the venting inducing portion 112 from the external area may be blocked.

Since the pressure of the seating portion 111 is higher than that of the external area, the gas in the seating portion 111 may be ejected to the external area, and when the venting inducing portion 112 has an excessively large size, external air may be partially induced to the seating portion 111. The venting inducing portion 112 may address the above-described issue by limiting the sizes of the venting inducing portion 112.

Accordingly, as oxygen in the seating portion 111 is depleted, the flame in the seating portion 111 may be extinguished.

For example, when the cross-sectional area A2 of the venting inducing portion 112 is less than 10% of the area A1 of the one end 110a of the cell support member 110 or less than 99 mm$^2$, the flame may be smothered and extinguished.

More preferably, when the cross-sectional area A2 of the venting inducing portion 112 is less than 75 mm$^2$, the effect of extinguishing flame may be increased.

Also, the venting inducing portion 112 may need to have a size in which the flame or gas generated by the seating portion 111 may be discharged externally.

For example, when the cross-sectional area A2 of the venting inducing portion 112 is greater than 0.1% of the area A1 of the one end 110a of the cell support member 110 or greater than 5 mm$^2$, the venting inducing portion 112 may emit the flame or gas.

More preferably, when the cross-sectional area A2 of the venting inducing portion 112 is greater than 25 mm$^2$, the effect of discharging the flame or gas externally may improve.

The limitation of the cross-sectional area A2 of the venting inducing portion 112 may be confirmed through the experimental results in Table 1 below.

TABLE 1

|  | Cross-sectional area of venting inducing portion (mm$^2$) | Whether smothering extinguishment induced |
|---|---|---|
| Comparative example 1 | 4 | X |
| Inventive example 1 | 25 | ◯ |
| Inventive example 2 | 50 | ◯ |
| Inventive example 3 | 75 | ◯ |
| Comparative example 2 | 100 | X |

In comparative example 1, as the cross-sectional area A2 of the venting inducing portion 112 was too small, the flame or gas was not discharged from the seating portion 111, such that pressure in the seating portion 111 increased, and the portion other than the venting inducing portion 112 exploded, and accordingly, the smothering extinguishment was not induced.

In comparative example 2, as the cross-sectional area A2 of the venting inducing portion 112 was too large, external oxygen flowed into the seating portion 111 such that the smothering extinguishment was not induced.

Also, the venting inducing portion 112 may be configured to have an elongated slot hole to discharge the flame in the seating portion 111 and to block the inflow of external air.

Also, the cell support member 110 may induce the flame to the external area while ejecting the gas in the seating portion 111 to the external area through the venting inducing portion 112, and electrolyte leaked from the secondary battery cell C may be discharged. In the example embodiment, a liquid guide tab 114 for guiding the leaking electrolyte may be formed, which will be described later with reference to FIG. 3.

Also, the cell support member 110 may include a blocking member 113 to maintain the venting inducing portion 112 to be in a closed state in a normal state. The detailed description thereof will be described later with reference to FIG. 4A and FIG. 4B.

The case member 120 may be configured to surround the seating portion 111 in which the secondary battery cell C is disposed. Accordingly, when a flame is generated by explosion of the secondary battery cell C, the flame may be guided to the venting inducing portion 112.

Also, a thickness and a material of the case member 120 may be limited such that fire resistance against a flame may be secured when a flame is generated in the seating portion 111. The detailed description thereof will be described later with reference to FIGS. 5 and 6.

Also, the case member 120 may be disposed to be inserted to upper and lower portions of the cell support member 110, and the shape of the ends thereof may be limited such that the case member 120 may be in close contact with the cell support member 110. The detailed description thereof will be described later with reference to FIGS. 5 and 6.

Figure 3:
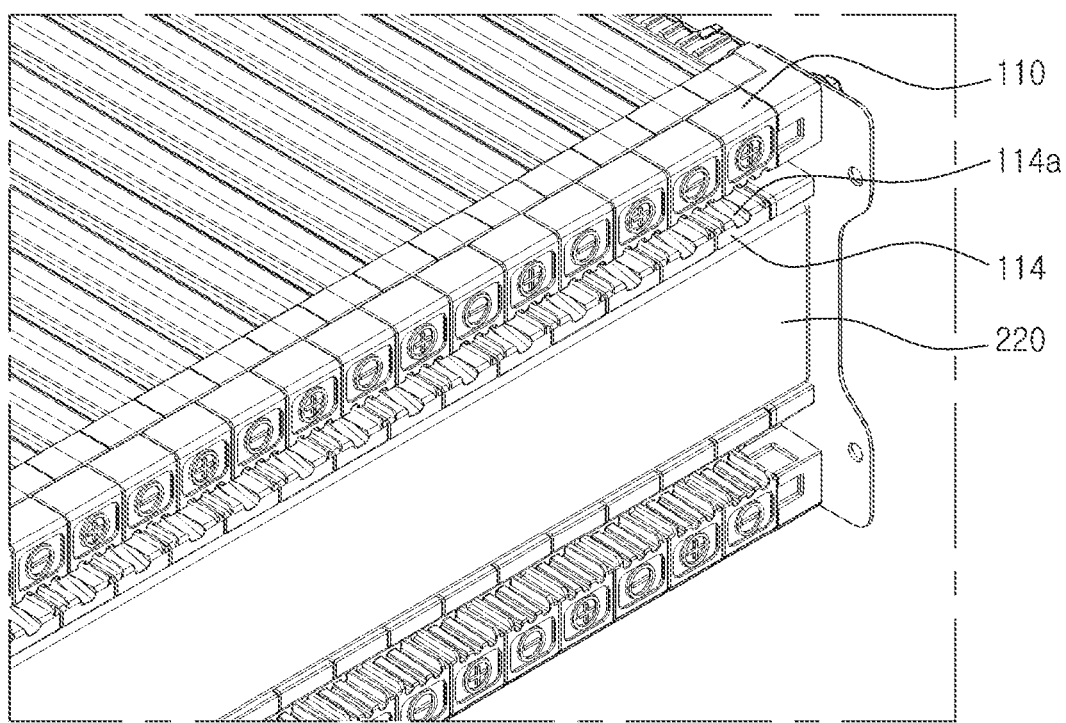
FIG. 3 is a perspective diagram illustrating a liquid guide tab portion of a battery sub-packing unit according to an example embodiment of the present disclosure.

FIG. 3 is a perspective diagram illustrating a liquid guide tab 114 portion of a battery sub-packing unit 100 according to an example embodiment. Referring to FIG. 3, the cell support member 110 of the battery sub-packing unit 100 in an example embodiment may include a liquid guide tab 114 disposed on an external side of the one end 110a of the cell support member 110 on which the venting inducing portion 112 is formed, disposed on a lower side of the venting inducing portion 112, and including a rail groove 114a for guiding leakage of the electrolyte caused by explosion of the secondary battery cell C.

The liquid guide tab 114 may be configured to guide the discharge of the electrolyte leaked from the secondary battery cell C when the secondary battery cell C explodes.

To this end, the liquid guide tab 114 may be disposed on a lower side of the venting inducing portion 112 to guide the discharged electrolyte while ejecting the gas in the seating portion 111 to an external area through the venting inducing portion 112.

The liquid guide tab 114 may include a rail groove 114a for guiding the electrolyte. The rail groove 114a may be formed in a length direction of the liquid guide tab 114 configured to extend from the venting inducing portion 112 to an external side.

Figure 4A:
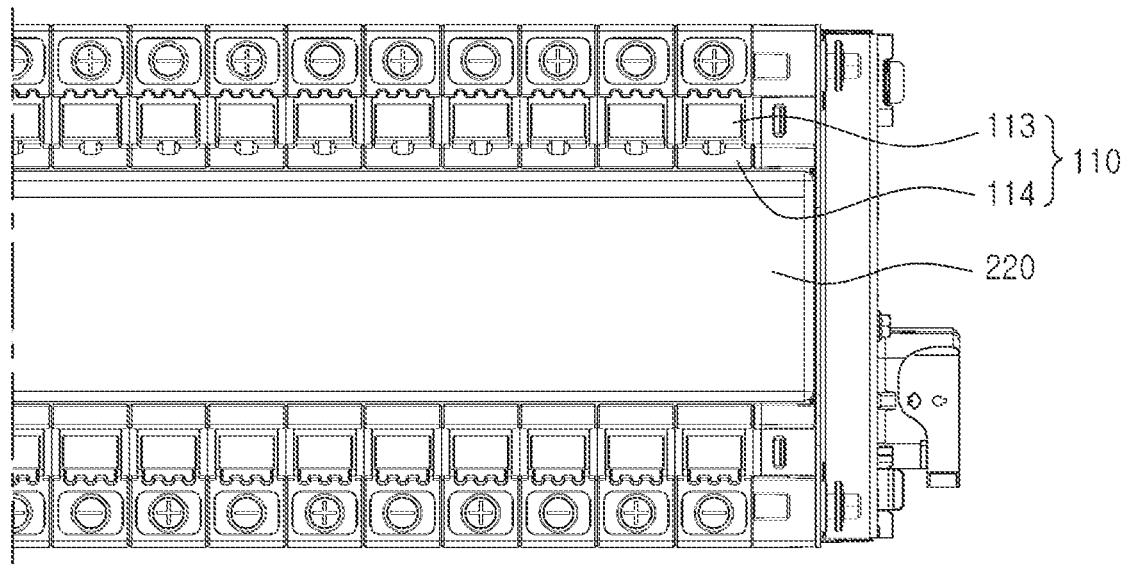
FIG. 4A and FIG. 4B are a diagram illustrating a state in which a battery sub-packing unit includes a blocking member and a state in which the blocking member is removed according to an example embodiment of the present disclosure.
Figure 4B:
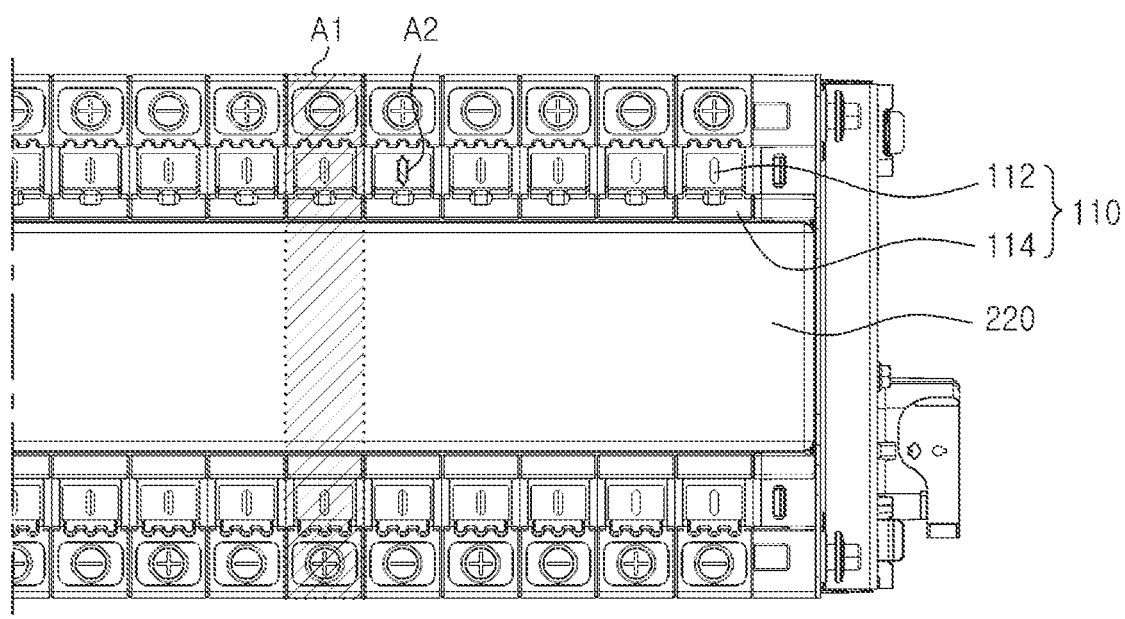

FIG. 4A and FIG. 4B are a diagram illustrating a state in which a battery sub-packing unit 100 includes a blocking member 113 and a state in which the blocking member 113 is removed according to an example embodiment. Referring to FIG. 4, the cell support member 110 of the battery sub-packing unit 100 in an example embodiment may include a blocking member 113 attached to an external side of the one end 110a of the cell support member 110, blocking the venting inducing portion 112, and opening the venting inducing portion 112 by being detached when the pressure in seating portion 111 increases due to the explosion of the secondary battery cell C.

The cell support member 110 may include the blocking member 113 such that the venting inducing portion 112 may be maintained to be in a closed state in a normal state.

By sealing the venting inducing portion 112 by the blocking member 113, natural extinguishing may be induced by exhaustion of oxygen at an initial stage of flame generation in the seating portion 111.

The blocking member 113 may be detached to open the venting inducing portion 112 to eliminate the high-pressure environment in the seating portion 111. Accordingly, when the plurality of secondary battery cells C are provided in the seating portion 111, the issue in which the pressure increases by the explosion of one of the secondary battery cells C such that another secondary battery cell C explodes due to the increased pressure may be prevented.

Figure 5:
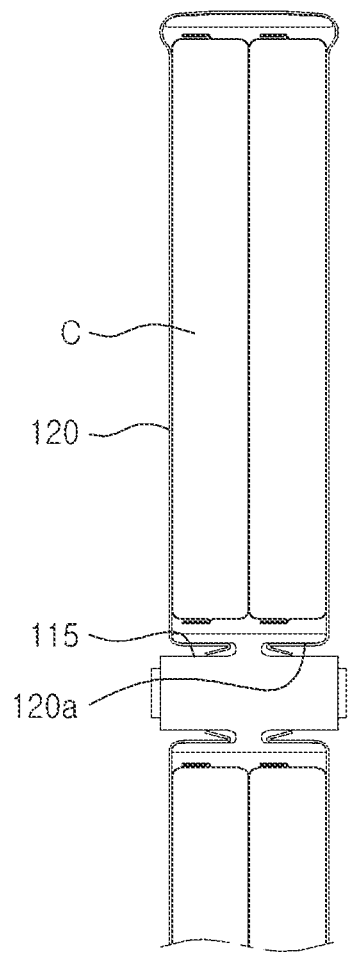
FIG. 5 is a cross-sectional diagram illustrating a battery sub-packing unit according to an example embodiment of the present disclosure.
Figure 6:
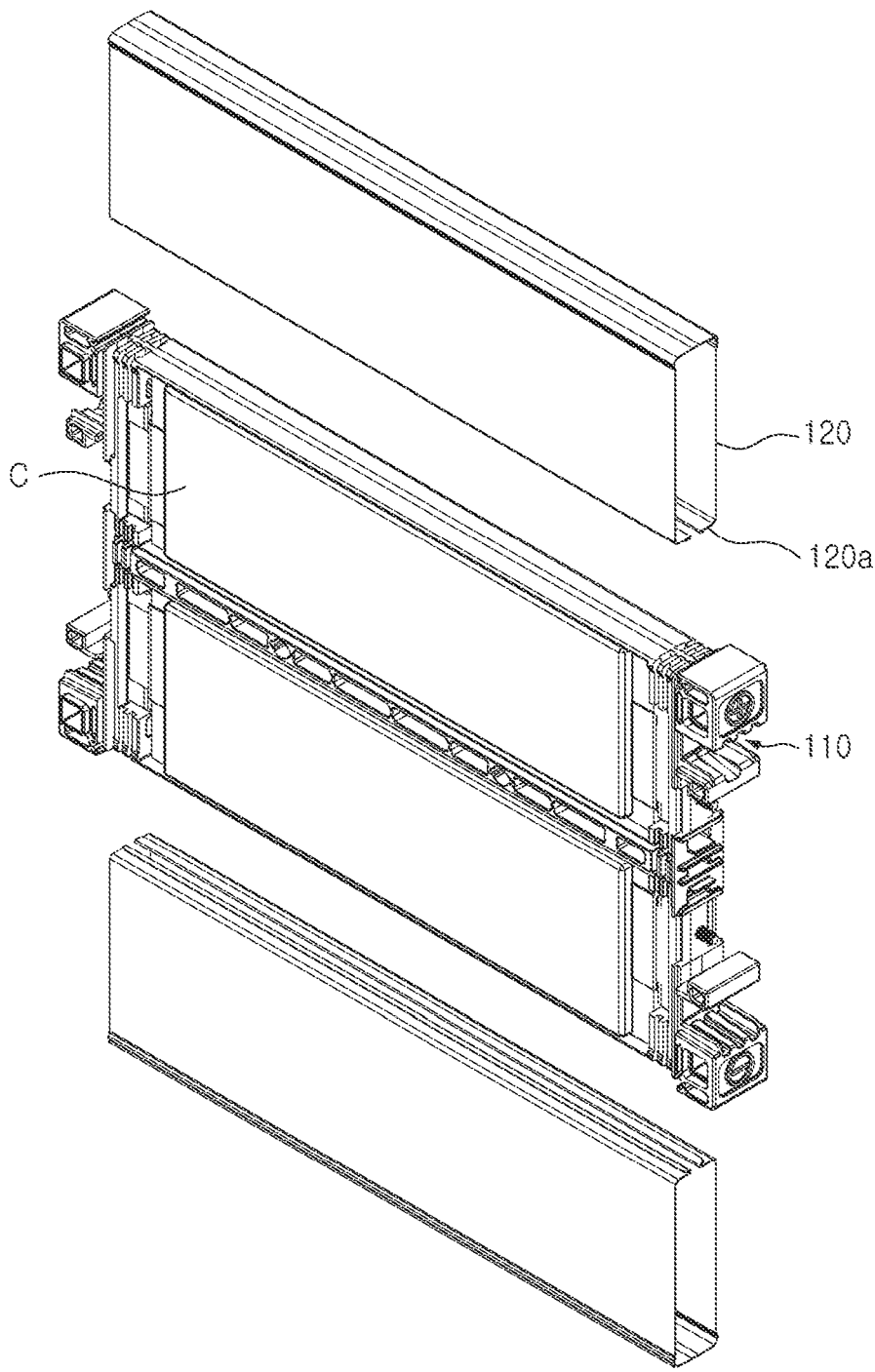
FIG. 6 is a perspective diagram illustrating a state in which a case member is separated from a battery sub-packing unit according to an example embodiment of the present disclosure.

FIG. 5 is a cross-sectional diagram illustrating a battery sub-packing unit 100 according to an example embodiment. FIG. 6 is a perspective diagram illustrating a state in which a case member 120 is separated from a battery sub-packing unit 100 according to an example embodiment. Referring to FIGS. 5 and 6, the case member 120 of the battery sub-packing unit 100 in an example embodiment may be formed of a single metal material or an alloy material maintaining a shape thereof up to at least 800° C.

The material of the case member 120 is not limited to iron or aluminum, and a metal material, or an alloy material, a mixture of a plurality of metals, which maintains a shape thereof at 800° C., may be used as the material of the case member 120 in the example embodiment.

As an example, the case member 120 of the battery sub-packing unit 100 in the example embodiment may be formed of iron (Fe) in a thickness of 0.45 mm to 2 mm or aluminum (Al) in a thickness of 0.8 mm to 3 mm.

The case member 120 may be formed of a metal material such that the case member 120 may prevent the flame of the secondary battery cell C from spreading.

Specifically, the material and thickness of the case member 120 may be limited because, by configuring the material and thickness as above, resistance against the generation of flame of the secondary battery cell C may be implemented and the amount of the material to be used may be reduced.

TABLE 2

|  | Material | | | |
| --- | --- | --- | --- | --- |
|  | Aluminum | | Iron | |
| Thickness (mm) | 0.5 | 1.0 | 0.65 | 1.0 |
| Whether case member broken | ○ | X | X | X |
| Maximum temperature of ignited secondary battery cell (° C.) | 1360 | 760 | 1360 | 1360 |
| Maximum temperature of surrounding secondary battery cell (° C.) | 790 | 120 | 160 | 160 |
| Whether flame spread | ○ | X | X | X |

As indicated in Table 1 above, even when the case member 120 was formed of iron in a thickness of 0.65 mm, the case member 120 was not broken. Accordingly, the possibility of breakage of the case member 120 formed of iron in a thickness of 0.45 mm was low.

Even when the case member 120 is formed of aluminum in a thickness of at least 1.0 mm, the case member 120 was not broken. Accordingly, the possibility of breakage of the case member 120 formed of aluminum in a thickness of 0.8 mm was low.

Thus, it has been indicated that, by limiting the material and thickness range of the case member 120 as above, breakage of the case member 120 may be prevented such that no flame may spread.

As the case member 120 is formed of a metal material such as iron or aluminum, the case member 120 may also perform a cooling function of discharging heat generated by the secondary battery cell C to the external area.

The material and the thickness of the case member 120 may be limited to reduce the amount of the material to be used.

In other words, the case member 120 may be formed of iron in a thickness of 2 mm, or may be formed of aluminum in a thickness of 3 mm to reduce the material.

The case member 120 of the battery sub-packing unit 100 in an example embodiment has one end configured to be closed and the other end configured to be open, such that that the one end and the other end may be inserted into upper and lower portions of the cell support member 110 in which the secondary battery cell C is accommodated, respectively.

To this end, as an example shape of the of the case member 120 in which the one end is closed and the other end is open, the case member 120 may have a "⊏" shape.

Accordingly, the secondary battery cell C may be accommodated in the upper end and the lower end of the cell support member 110, and the case member 120 having a "⊏" shape may be coupled to the upper end and the lower end of the cell support member 110 and may surround the cell support member 110.

Accordingly, the case member 120 may surround the secondary battery cell C seated on the cell support member 110, and may thus induce the flame generated in the secondary battery cell C to the venting inducing portion 112.

In the case member 120 of the battery sub-packing unit 100 in an example embodiment, the a coupling end 120a, the other end, may be bent to be inserted into a coupling groove 115 formed in the cell support member 110 and may be bent multiple times, such that the case member 120 may have a notch shape to be in close contact with the cell support member 110.

The case member 120 may be configured as above to be in close contact with the support member 110. The shape of the coupling end 120a of the case member 120 may be limited because, by configuring the internal area of the seating portion 111, other than the venting inducing portion 112, to be a sealed area, the flame generated in the seating portion 111 may be induced to the flame inducing part 112.

The one end of the case member 120 may be configured to be closed, and the coupling end 120a, the other end, may be configured to be open to be inserted into the cell support member 110. In this case, by limiting the shape of the coupling end 120a, the internal area of the seating portion 111 other than the venting inducing portion 112 may be sealed.

The coupling end 120a may be primarily bent in a direction of the coupling groove 115, formed on the cell support member 110 in the thickness direction of the cell support member 110, and may be secondarily bent to have the notch shape to be in close contact with the coupling groove 115.

Figure 7:
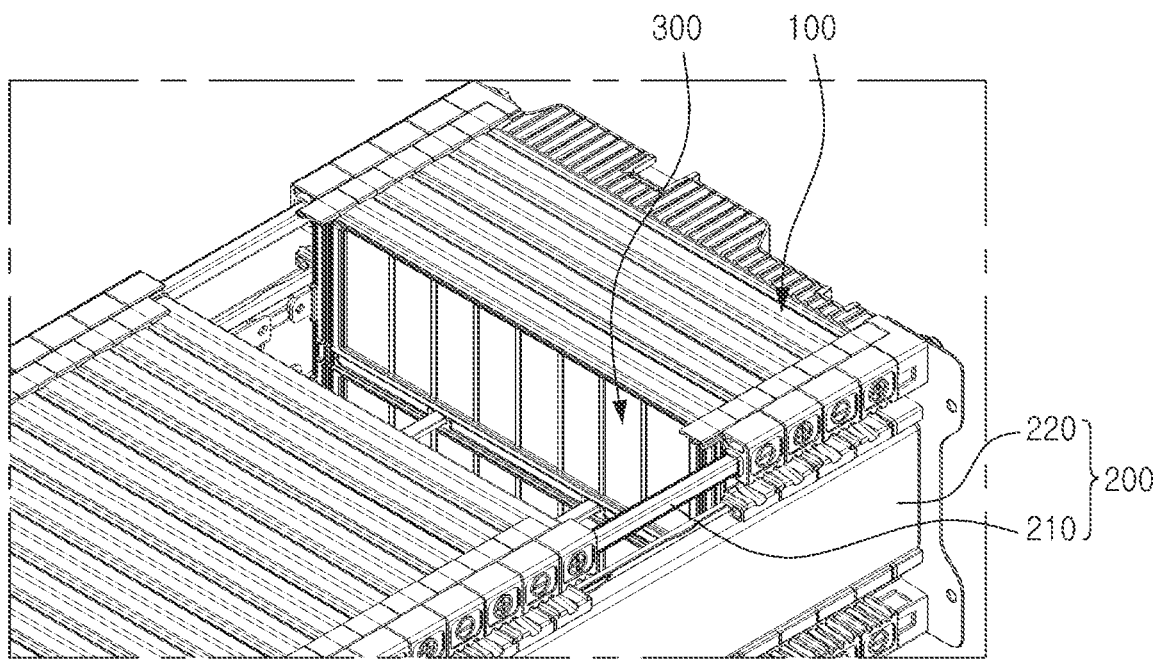
FIG. 7 is a perspective diagram illustrating a battery sub-packing unit and a battery module including the battery sub-packing unit according to an example embodiment of the present disclosure.
Figure 8:
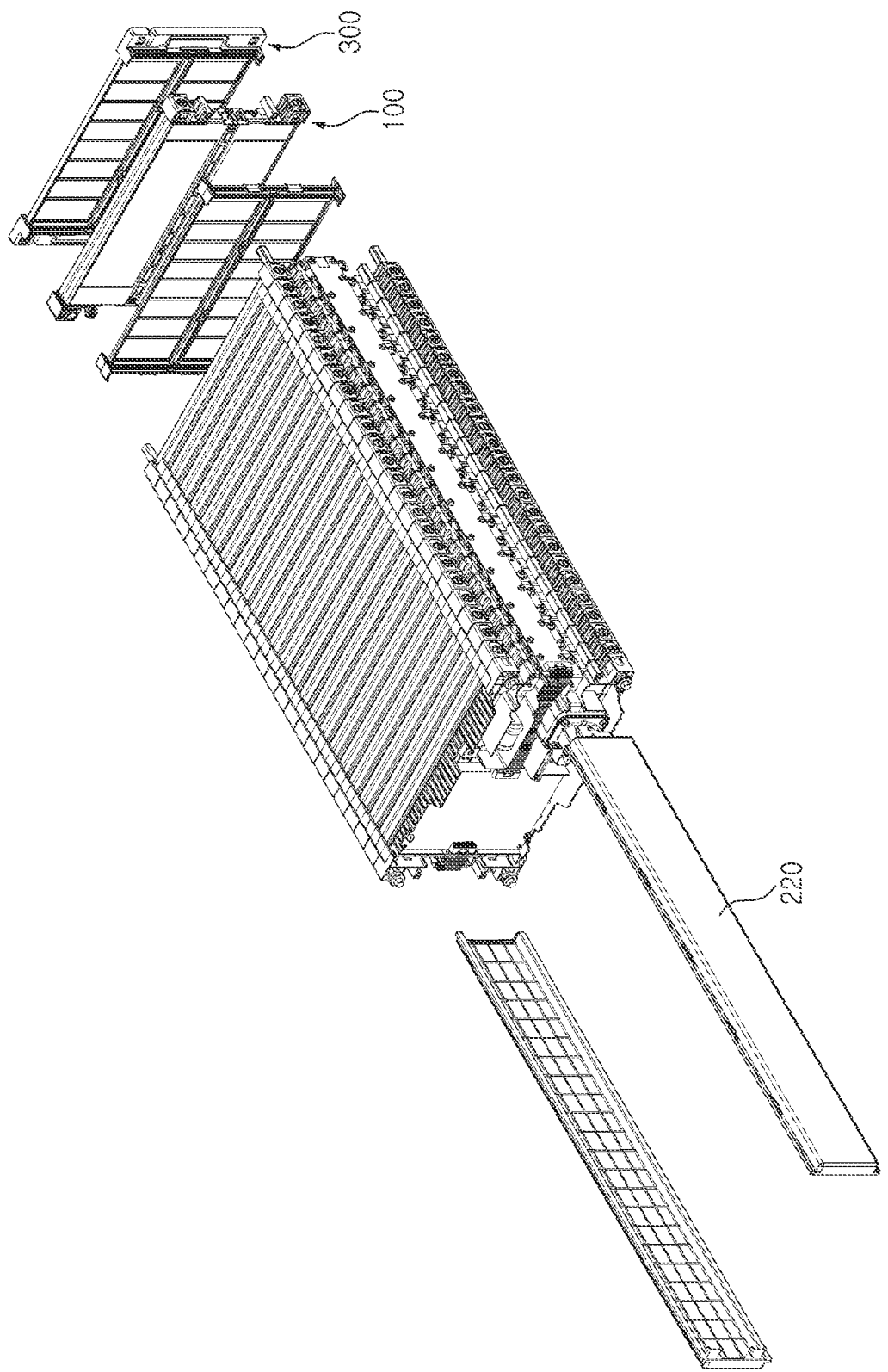
FIG. 8 is an exploded perspective diagram illustrating a battery sub-packing unit and a battery module including the battery sub-packing unit according to an example embodiment of the present disclosure.

FIG. 7 is a perspective diagram illustrating a battery sub-packing unit 100 and a battery module including the battery sub-packing unit according to an example embodiment. FIG. 8 is an exploded perspective diagram illustrating a battery sub-packing unit 100 and a battery module including the battery sub-packing unit according to an example embodiment.

Referring to FIGS. 7 and 8, a plurality of secondary battery cells C, a battery sub-packing unit 100 including a cell support member 110 for accommodating the plurality of secondary battery cells C, and a case member provided to surround the secondary battery cell C, and a body frame member 200 in which the plurality of battery sub-packing units 100 are installed may be included.

The cell support member 110 of the battery module in the example embodiment may include a seating portion 111 for accommodating the plurality of the secondary battery cells C, and a venting inducing portion 112 connecting the seating portion 111 to an external area.

As the battery module in the example embodiment includes the battery sub-packing unit 100, a flame caused by the explosion of one of the secondary battery cells C may be induced to the flame induction unit 112 and additional explosion may be prevented.

The battery module in the example embodiment may further include a barrier member 300 to prevent propagation of flame between the battery sub-packing units 100, and a detailed description thereof will be provided with reference to FIGS. 9 to 14.

The body frame member 200 may be configured to have a box form in which a plurality of the battery sub-packing units 100 are accommodated, or may be configured to include a connection member 210 having a bar shape in which the plurality of battery sub-packing units 100 are tied and connected to each other.

When the battery sub-packing unit 100 is configured to be connected to the connection member 210, a side wall cover member 220 for enclosing a side portion of the plurality of battery sub-packing units 100 connected to each other by the connection member 210 may be included.

The secondary battery cell C may include an electrode assembly and a cell body member surrounding the electrode assembly.

The electrode assembly may substantially include an electrolyte and may be accommodated in the cell body member. The electrolyte may include a lithium salt such as $LiPF_6$ or $LiBF_4$ in an organic solvent such as ethylene carbonate (EC), propylene carbonate (PC), diethyl carbonate (DEC), ethyl methyl carbonate (EMC), dimethyl carbonate (DMC), or the like. Furthermore, the electrolyte may be liquid, solid or gel-type.

The cell body member may be configured to protect the electrode assembly and to accommodate the electrolyte. For example, the cell body member may be configured as as a pouch-shaped member or a can-shaped member. The pouch-shaped member may accommodate the electrode assembly by sealing the electrode assembly on three surfaces. The electrode assembly may be accommodated in the pouch-shaped member by three surfaces, an upper surface and both side surfaces other than a lower surface and one surface, and the pouch-shaped member may be folded to seal the electrode assembly. The can-shaped member may be configured to accommodate the electrode assembly by sealing the electrode assembly on a single surface. The electrode assembly may be accommodated in the can-shaped member by a single surface, an upper surface other than a lower surface and both side surfaces, and the can-shaped member may be folded to seal the electrode assembly.

In the battery sub-packing unit 100 of the battery module in the example embodiment, the secondary battery cell C to be accommodated may be configured as a pouch-type secondary battery cell C or a lithium ion secondary battery cell.

Figure 9:
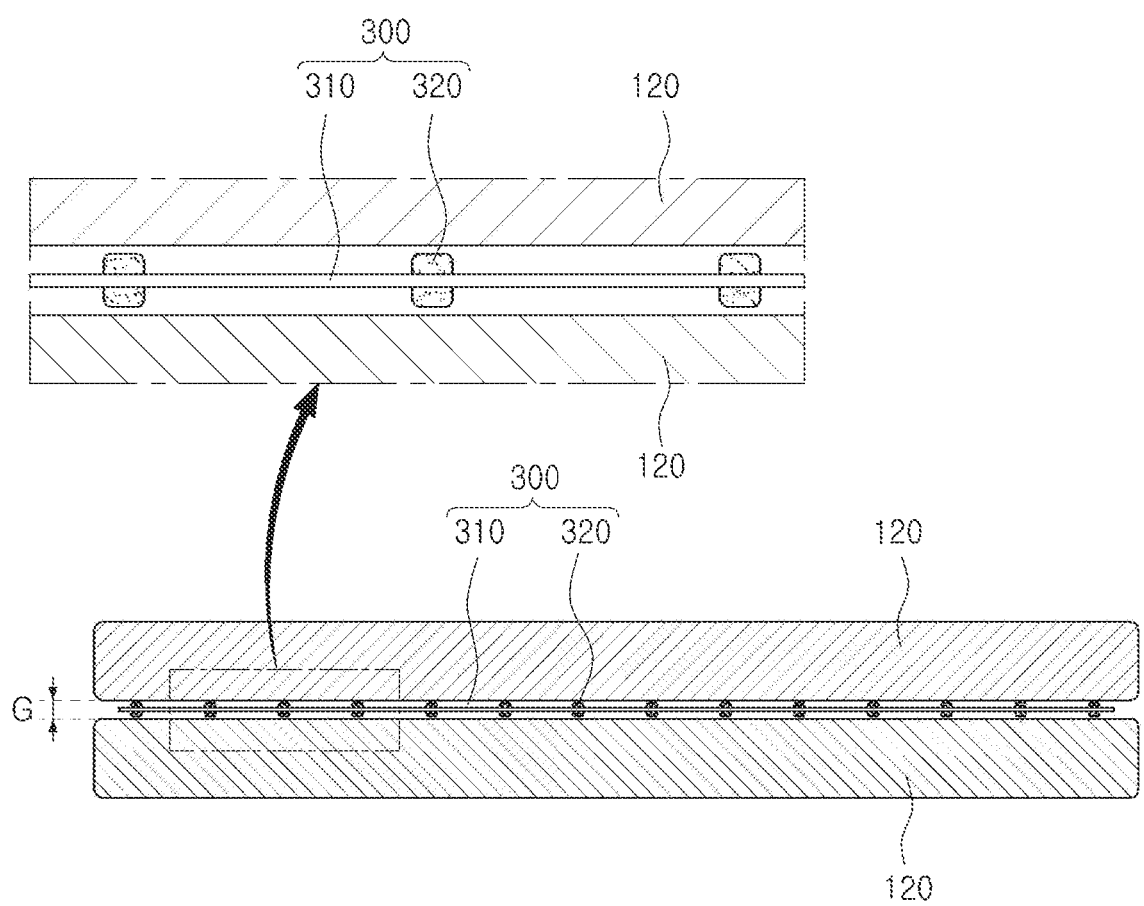
FIG. 9 is a plan diagram illustrating a barrier member portion in a battery module according to an example embodiment of the present disclosure.

FIG. 9 is a plan diagram illustrating a barrier member 300 portion in a battery module according to an example embodiment. Referring to FIG. 9, a battery module in the example embodiment may include a barrier member 300 disposed between the plurality of battery sub-packing units 100 adjacent to each other and preventing flame or heat from spreading.

The barrier member 300 may be disposed between the battery sub-packing units 100 adjacent to each other to prevent flame or heat from spreading between the secondary battery cells C provided in each different battery sub-packing unit 100.

The barrier member 300 of the battery module in the example embodiment may be disposed between the plurality of case members 120 adjacent to each other with a spaced gap G of at least 7 mm therebetween.

The barrier member 300 may be configured as above because, when the thickness is 7 mm or greater, and a flame is generated by the secondary battery cell C in the battery sub-packing unit 100 on one side, the spreading of fire to a neighboring secondary battery cell C may be prevented, and transfer of heat generated by the secondary battery cell C in the battery sub-packing unit 100 on one side to a neighboring battery sub-packing unit 100 by radiation or conduction may be reduced. This configuration is indicated in Table 3 below.

TABLE 3

| | Material | Thickness (mm) | Form | Temperature of ignited secondary battery cell e (° C.) | Temperature of neighboring secondary battery cell e (° C.) | Whether flame spread |
|---|---|---|---|---|---|---|
| Comparative example 3 | PPS | 6 | Three 2 mm plates | 100 | 48.8 | ◯ |
| Comparative example 4 | PPS | 6 | Three 2 mm plates | 130 | 59.4 | ◯ |
| Comparative example 5 | PPS | 6 | Three 2 mm plates | 160 | 77.7 | ◯ |
| Comparative example 6 | BMC | 5 | One 5 mm plate | 100 | 48.8 | ◯ |
| Comparative example 7 | BMC | 5 | One 5 mm plate | 130 | 66.5 | ◯ |
| Comparative example 8 | BMC | 5 | One 5 mm plate | 160 | 80.9 | ◯ |
| Inventive example 4 | PPS | 12 | Four 3 mm plates | 100 | 27.4 | X |
| Inventive example 5 | PPS | 12 | Four 3 mm plates | 130 | 40.4 | X |
| Inventive example 6 | PPS | 12 | Four 3 mm plates | 160 | 50.8 | X |
| Inventive example 7 | BMC | 7 | One 4 mm plate, support protrusion of 1.5 mm on one surface, and support protrusion of 4 mm on the other surface | 100 | 32.8 | X |
| Inventive example 8 | BMC | 7 | One 4 mm plate, support protrusion of 1.5 mm on one surface, and support protrusion of 4 mm on the other surface | 130 | 43.9 | X |
| Inventive example 9 | Gypsum | 7 | One 7 mm plate | 100 | 39.3 | X |
| Inventive example 10 | Gypsum | 7 | One 7 mm plate | 130 | 55.5 | X |

In Table 2, PPS is an abbreviation of a polyphenylene sulfide material, and BMC is an abbreviation of a bulk molding compound material. Also, BMC may be, for example, a material including a thermosetting polymer that maintains a shape thereof up to at least 800° C.

As indicated in Table 3, when the barrier member 300 was a PPS material, and the thickness was 6 mm, the fire spread, but when the thickness was 12 mm, the fire did not spread. Also, when the barrier member 300 was a BMC material, and the thickness was 5 mm, the fire spread, but when the thickness was 7 mm, the fire did not spread. When the barrier member 300 was gypsum, and the thickness was 7 mm, the fire did not spread.

Thus, it has been indicated that, when the thickness of the barrier member 300 was at least 7 mm, the barrier member 300 may have an effect of preventing fire from spreading.

However, since the barrier member 300 is disposed in a space between the battery sub-packing units 100 adjacent to each other, the thickness of at least 7 mm of the barrier member 300 may correspond to the gap G between the battery sub-packing units 100 adjacent to each other, in which the barrier member 300 is disposed.

Thus, when the barrier member 300 is disposed between the case members 120 adjacent to each other with a spaced gap G of at least 7 mm therebetween, an effect of preventing fire spread may be obtained.

Also, the barrier member 300 may be configured to occupy overall space between the case members 120 adjacent to each other, but to reduce the conduction effect by being in contact with the case member 120, the barrier member 300 may include a support protrusion 320. The barrier member 300 may further include a shielding surface 310 corresponding to opposing external surfaces of the case members 120 adjacent to each other to reduce radiant heat transfer between the adjacent case members 120.

Specifically, the barrier member 300 of the battery module in the example embodiment may include the shielding surface 310 disposed between the case members 120 adjacent to each other and having external surfaces opposing each other, and the support protrusion 320 disposed on the shielding surface 310 and configured to be protrude in a direction of the external surface of the case member 120.

The shielding surface 310 may be configured to have a shape extending to an area corresponding to the external surface of the case member 120 in order to block the transfer of radiant heat generated by the case member 120. However, an example embodiment thereof is not limited thereto, and the shielding surface 310 may have a shape opposing a portion of the external surface of the case member 120.

The shielding surface 310 may have a bellows shape, such that the shielding surface 310 may elastically absorb high-pressure energy caused by the explosion in the battery sub-packing unit 100 on one side and may reduce the influence on the neighboring battery sub-packing unit 100 on the other side. The detailed description thereof will be described later with reference to FIG. 14.

The support protrusion 320 may be configured to prevent the issue in which the case member 120 is pressed and in contact with the shielding surface 310 as the secondary battery cell C disposed in the case member 120 swells. In other words, when the secondary battery cell C swells, the case member 120 may be pushed in the direction of the shielding surface 310. In this case, by including the support protrusion 320, the issue in which the case member 120 is pressed and in contact with the shielding surface 310 may be prevented.

Accordingly, the issue of increased heat conduction caused by the increased contact area between the case member 120 and the shielding surface 310 may be prevented.

Also, when the support protrusion 320 is disposed between the case members 120 adjacent to each other, the support protrusion 320 may be disposed to be in contact with the case member 120 or may be spaced apart from the support protrusion 320.

When the support protrusion 320 is disposed to be in contact with the case member 120, the support protrusion 320 may also press the case member 120 in the direction of the cell support member 110. In other words, the support protrusion 320 may press the case member 120 to be in close contact with the cell support member 110.

To this end, the support protrusion 320 may be configured to have a shape in which the support protrusion 320 is in point-contact with the case member 120 or a shape in which the support protrusion 320 is in line-contact with the case member 120. The detailed description thereof will be described later with reference to FIGS. 10 to 13.

Also, the barrier member 300 of the battery module in the example embodiment may be formed of a thermosetting polymer material, a polyphenylene sulfide material or a material including gypsum, maintaining a shape thereof up to at least 800° C.

The material of the barrier member 300 as described above may secure fire resistance such that the issue in which the flame generated in the battery sub-packing unit 100 on one side is in direct contact with the battery sub-packing unit 100 on the other side may be prevented.

Also, the material of the barrier member 300 may prevent radiant heat transfer or conduction heat transfer, thereby reducing the rate of transfer of heat generated by the battery sub-packing unit 100 on one side to the battery sub-packing unit 100 on the other side.

Figure 10A:
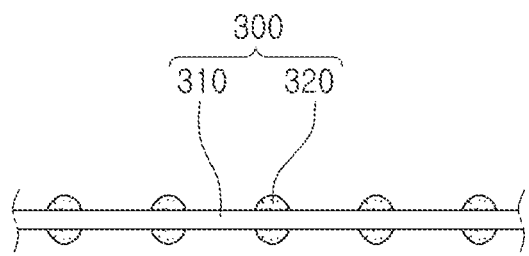
FIG. 10A and FIG. 10B are a cross-sectional diagram illustrating an example embodiment of a barrier member in a battery module according to an example embodiment of the present disclosure.
Figure 10B:
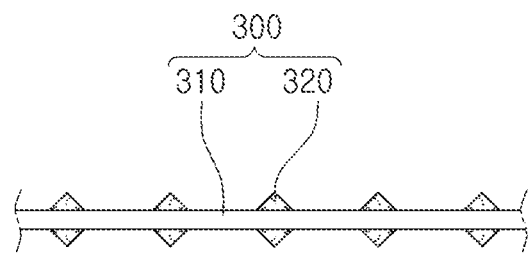
Figure 11A:
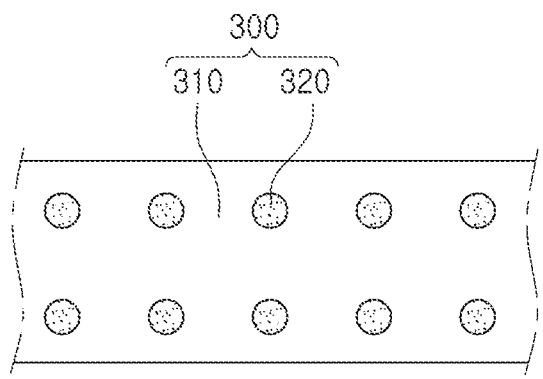
FIG. 11A and FIG. 11B are a plan diagram illustrating an example embodiment in which a barrier member is in point-contact in a battery module according to an example embodiment of the present disclosure.
Figure 11B:
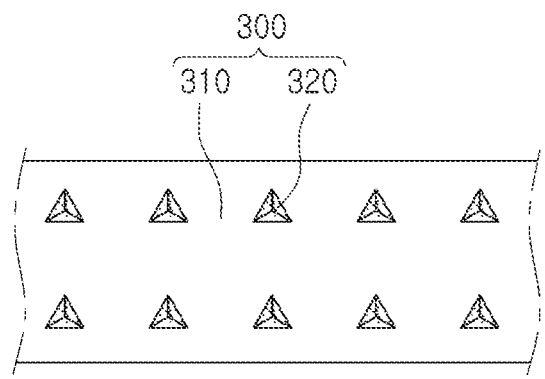
Figure 12A:
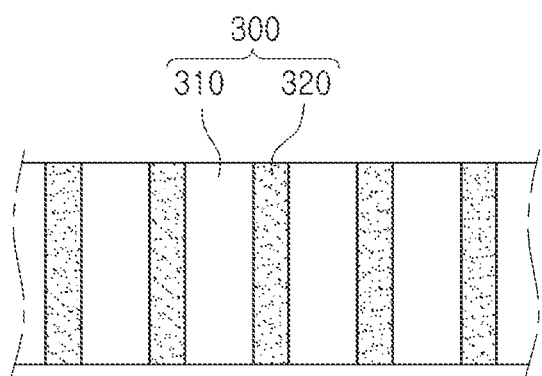
FIG. 12A and FIG. 12B are a plan diagram illustrating an example embodiment in which a barrier member is in line-contact in a battery module according to an example embodiment of the present disclosure.
Figure 12B:
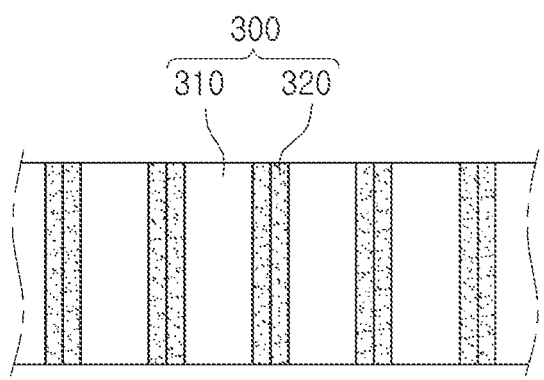
Figure 13:
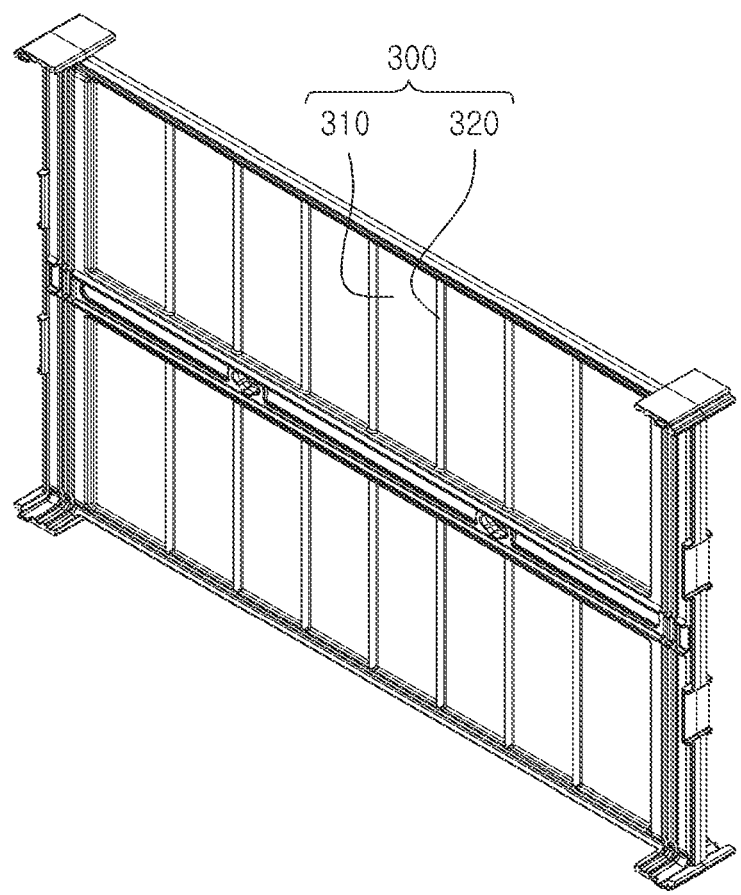
FIG. 13 is a perspective diagram illustrating a barrier member in a battery module according to an example embodiment of the present disclosure.

FIG. 10A and FIG. 10B are a cross-sectional diagram illustrating an example embodiment of a barrier member 300 in a battery module according to an example embodiment. FIG. 11A and FIG. 11B are a plan diagram illustrating an example embodiment in which a barrier member 300 is in point-contact in a battery module according to an example embodiment. FIG. 12A and FIG. 12B are a plan diagram illustrating an example embodiment in which a barrier member 300 is in line-contact in a battery module according to an example embodiment. FIG. 13 is a perspective diagram illustrating a barrier member 300 in a battery module according to an example embodiment.

Referring to the diagram, a support protrusion 320 of the battery module in the example embodiment may be configured to have a hemispherical shape or a pyramidal shape configured to be in point-contact with an external surface of the case member 120 and may protrude to the shielding surface 310.

Also, the support protrusion 320 of the battery module in the example embodiment may be configured to have a semicircular columnar shape or an angular columnar shape configured to be in line-contact with an external surface of the case member 120 and may protrude to the shielding surface 310.

Thus, the support protrusion 320 may have a shape in point-contact with the case member 120 or a shape in line-contact with the case member 120.

The shape of the support protrusion 320 may be limited as described above to reduce a rate of heat conduction when the support protrusion 320 is in contact with the case member 120.

In other words, the shape may be limited as above such that the support protrusion 320 may be configured to not be in surface-contact with the case member 120, thereby reducing the contact area.

As an example, as illustrated in FIG. 11A, the support protrusion 320 may have a hemispherical shape configured to be in point-contact, or may have a pyramid shape configured to be in point-contact as illustrated in FIG. 11B.

Also, as illustrated in FIG. 12A, the support protrusion 320 may have a semi-circular columnar shape configured to be in line-contact, or may have an angular columnar shape configured to be in line-contact as illustrated in FIG. 12B.

FIG. 10A is a cross-sectional diagram illustrating a hemispherical shape in which the support protrusion 320 is in point-contact or a semicircular column shape in which the support protrusion 320 is in line-contact, and FIG. 10B is a cross-sectional diagram illustrating an angular pyramid shape in which the support protrusion 320 is in point-contact or an angular columnar shape in which the support protrusion 320 is in line-contact.

Figure 14:
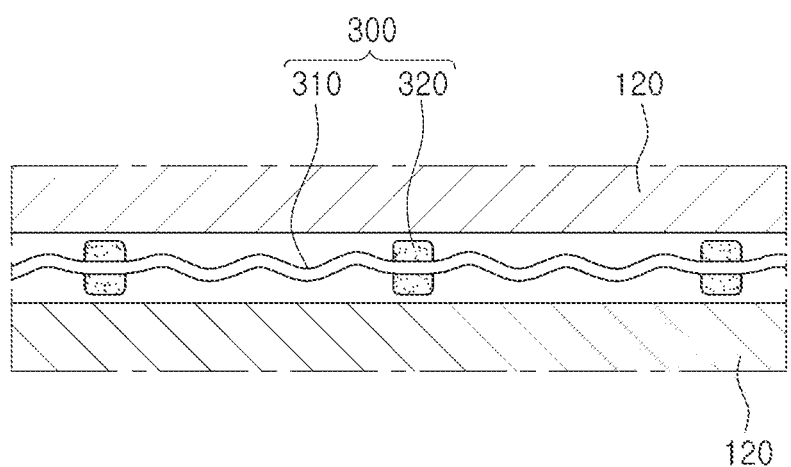
FIG. 14 is a plan diagram illustrating an example embodiment in which a shielding surface of a barrier member has a bellows shape in a battery module according to an example embodiment of the present disclosure.

FIG. 14 is a plan diagram illustrating an example embodiment in which a shielding surface 310 of a barrier member 300 has a bellows shape in a battery module according to an example embodiment. Referring to FIG. 14, at least a portion of the shielding surface 310 of the battery module in the example embodiment may have a bellows shape.

The shielding surface 310 may have a bellows shape, such that the shielding surface 310 may elastically absorb high-pressure energy caused by the explosion in the battery sub-packing unit 100 on one side, and may reduce the influence on the battery sub-packing unit 100 on the other side.

In other words, when the high-pressure gas pressurizes the shielding surface 310, the shape of the shielding surface 310 with a bellows shape may be elastically changed into a flat shape and may absorb the high-pressure kinetic energy as deformation energy. Accordingly, the influence of the explosion energy generated by the battery sub-packing unit 100 on one side on the adjacent battery sub-packing unit 100 may be reduced.

According to the aforementioned example embodiment, the battery sub-packing unit and the battery module including the same may prevent propagation of ignition of a secondary battery cell or may shield secondary battery cells to prevent heat generated by one of the secondary battery cell from spreading to another secondary battery cell.

Also, the battery sub-packing unit and the battery module including the same may induce a flame to one side or may smother and extinguish the flame when the secondary battery cell is ignited.

While the example embodiments have been illustrated and described above, it will be apparent to those skilled in the art that modifications and variations could be made without departing from the scope of the present disclosure as defined by the appended claims.

What is claimed is:

1. A battery sub-packing unit, comprising:
a plurality of pouch-type secondary battery cells;
a cell support member including a seating portion on which at least one secondary battery cell is seated and a venting inducing portion allowing the seating portion to communicate with the outside;
a case member provided to surround the secondary battery cells accommodated in the seating portion and sealing a periphery of the plurality of secondary battery cells,
wherein the venting inducing portion is disposed to oppose a sealing portion from which an electrode lead of the pouch-type secondary battery cell is drawn out,
wherein the cell support member includes a liquid guide tab disposed below the venting inducing portion and including a rail groove for guiding leakage of electrolyte discharged from the secondary battery cell formed therein, and
wherein the case member is bent such that a coupling end, which is opposite a closed end, is inserted into a coupling groove formed in the cell support member so as to be in close contact with the cell support member, and is bent multiple times to include a notch shape.

2. The battery sub-packing unit of claim 1, wherein the venting inducing portion forms a cross-sectional area larger than 0.1% and smaller than 10% of an area of the one side end of the cell support member.

3. The battery sub-packing unit of claim 1, wherein the venting inducing portion forms a cross-sectional area of 5-99 mm$^2$.

4. The battery sub-packing unit of claim 1, wherein the venting inducing portion forms a cross-sectional area of 25-75 mm$^2$.

5. The battery sub-packing unit of claim 1, wherein the cell support member includes a blocking member exposing the venting inducing portion while being released when pressure in the seating portion rises due to explosion of the secondary battery cell.

6. The battery sub-packing unit of claim 1, wherein the case member is formed of a single metal material or an alloy material which retains a shape thereof up to at least 800° C.

7. The battery sub-packing unit of claim 6, wherein the case member is formed of iron (Fe) having a thickness of 0.45-2 mm or aluminum (Al) having a thickness of 0.8-3 mm.

* * * * *